United States Patent [19]

West

[11] 4,162,141
[45] Jul. 24, 1979

[54] VARIABLE AIR FLOW OVEN
[76] Inventor: Clarence W. West, 208 S. LaSalle St., Chicago, Ill. 60604
[21] Appl. No.: 865,041
[22] Filed: Dec. 27, 1977
[51] Int. Cl.² ........................... F27B 9/00; F27B 5/16
[52] U.S. Cl. .................................. 432/144; 432/145; 432/152; 432/200
[58] Field of Search ................. 432/25, 144, 145, 152, 432/199, 200

[56] References Cited
U.S. PATENT DOCUMENTS

| | | | |
|---|---|---|---|
| 3,537,405 | 11/1970 | Verhoeven | 432/152 |
| 4,029,463 | 6/1977 | Johansson | 432/25 |
| 4,030,879 | 6/1977 | Stanasila | 432/144 |
| 4,032,289 | 6/1977 | Johnson et al. | 432/200 |
| 4,039,278 | 8/1977 | Denholm | 432/144 |

Primary Examiner—John J. Camby
Attorney, Agent, or Firm—Thomas F. Peterson

[57] ABSTRACT

A variable air flow oven is disclosed in which a variable air directing control means delivers varying amounts of heated air under various positive pressures in an alternating pattern to jet orifices in opposite side walls of the oven in an inverse ratio. Hot air jets from opposite sides of the oven meet at a region of common velocity in the processing chamber to produce a turbulent mixing of the hot air in a vertical plane. The turbulent heated air travels from one side of the oven to the other substantially throughout a heating period under the controlled operation of a motor driven mechanical linkage arrangement to assure even baking, cooking or drying of the products being processed through the entire processing chamber in the oven. The system operates at a positive pressure at all times, so that the main supply of heated air flows through one side duct and a smaller volume of heated air flows through the opposite side. As the air pressure is varied to the hot air jets in the opposite side walls, the vertical plane of turbulent heated air sweeps back and forth through the chamber, contacting the entire product, and then is drawn into a return duct for reheating and recirculation.

5 Claims, 6 Drawing Figures

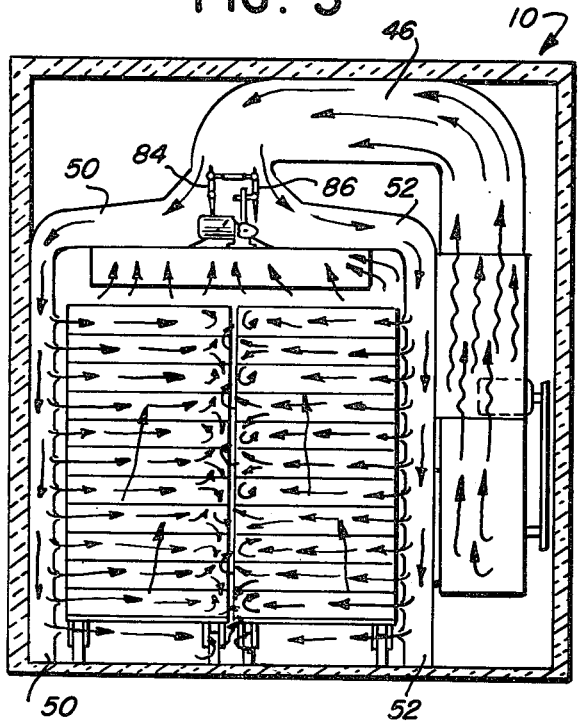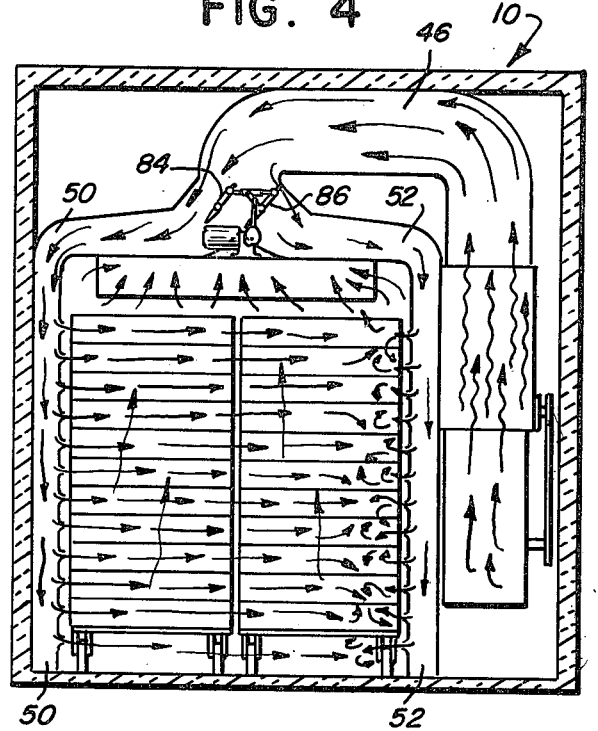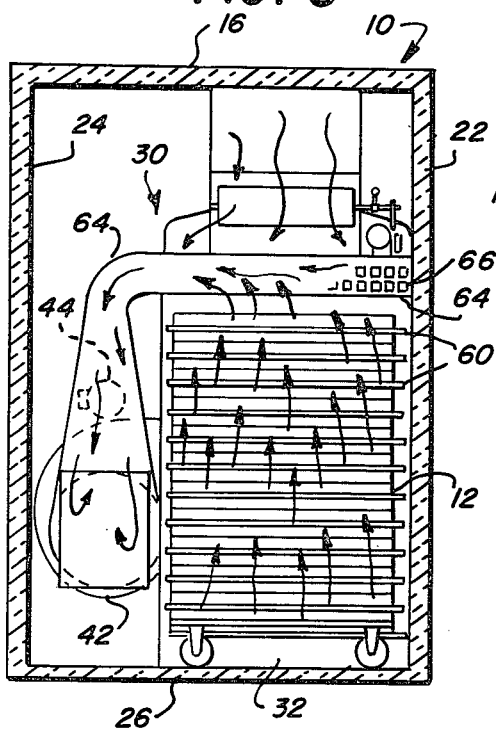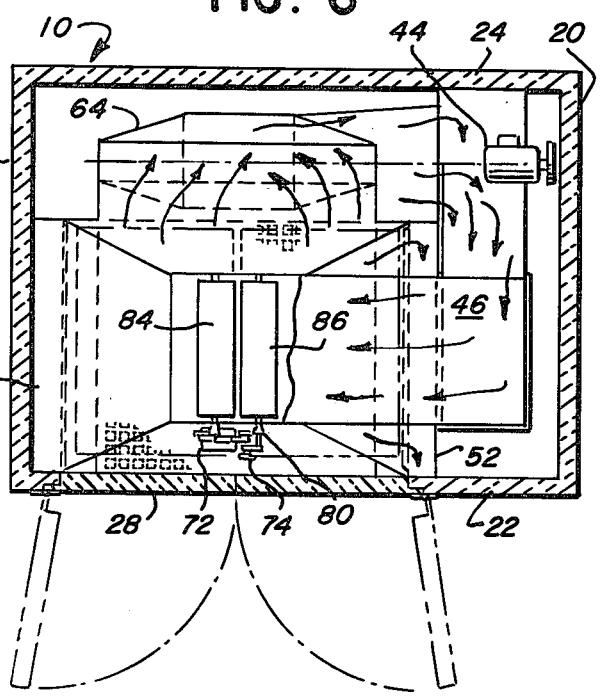

VARIABLE AIR FLOW OVEN

BACKGROUND OF THE INVENTION

This invention relates to a variable air flow oven employing an air directing control device to produce variable air flows under positive pressure in alternating patterns in inverse ratios through jet orifices in opposite side walls of an oven.

In the past, various devices have been employed to conduct heated air over a food product to be processed or cooked in an oven, and most of such devices have required the use of various arrangements to move the food product or the supporting racks in order to provide an even distribution and contact with heated air passing through the oven.

In one type of known system there is a reversible crossflow of heated air whereby static pressure increases on one side of the oven while a relative vacuum is drawn on the other causing the air to flow across a heated area. This method has a severe disadvantage in that the heated air cannot be drawn over a very large distance. Furthermore, it usually required movement of the food product to enable substantially uniform contact of the foods with the heated air.

Other types of mechanical ovens for food processing include revolving trays, travelling trays, rotary racks, and tunnel-conveyor type devices. In all these types of ovens, the temperature is not uniform throughout the cooking area of the oven, and the product must be moved through various heat zones. Ordinarily, heat is introduced into the baking chamber at the bottom or near the bottom of the oven and the product is kept in motion during the baking or processing cycle in order to pass through all temperature zones within the oven to attain the objective of even temperature processing for all the products. The requirement for various mechanical devices to move the product through the oven is a significant disadvantage, but it has been required in attempting to obtain uniform distribution of the heated air.

In contrast, a small home use oven has a very limited volume wherein it is not essential to move the product around in the oven to achieve satisfactory baking. This is entirely due to the very limited capacity of the cooking chamber.

However, in commercial ovens it has been necessary in the past to provide some kind of device to cause movement of the food product within the oven cooking chamber to insure that the product will move through the variable heat zones for uniform distribution and for even baking or processing.

SUMMARY OF THE INVENTION

It is the primary object of this invention to increase the efficiency of an oven, while avoiding the need for apparatus for movement of the products through the processing area within the oven.

This object is achieved by varying air pressure and controlling heated air flow with a variable air directing control device to deliver heated air under positive pressure in alternating patterns through jet orifices in the side walls of the oven chamber.

The air jet orifices deliver the hot air from opposite sides of the oven, and these hot air jets meet in a common vertical plane causing turbulence and mixing of the hot air which travels back and forth substantially throughout a heating period. By varying the air directing control means, increasing and decreasing the air pressure from side to side, the vertical plane of turbulent, mixed hot air travels from side to side, in effect sweeping the entire food product contained in the oven with hot turbulent cooking air.

An important feature is the provision for positive pressure within the system generating turbulent mixing of the hot air. This assures uniform baking or cooking by increased and deeper heat penetration of the food products being processed. It also shortens the cooking time thereby saving energy.

BRIEF DESCRIPTION OF THE DRAWINGS

FIGS. 3 and 4 are schematic front views of the oven, similar to FIG. 1 but on a smaller scale, showing the directing air vanes moved to alternate positions;

FIG. 5 is a reduced size schematic side view of the oven taken along lines 5—5 in FIG. 1; and FIG. 6 is a plan view of the top of the oven with the top wall removed.

DESCRIPTION OF THE PREFERRED EMBODIMENT

Figure 1:
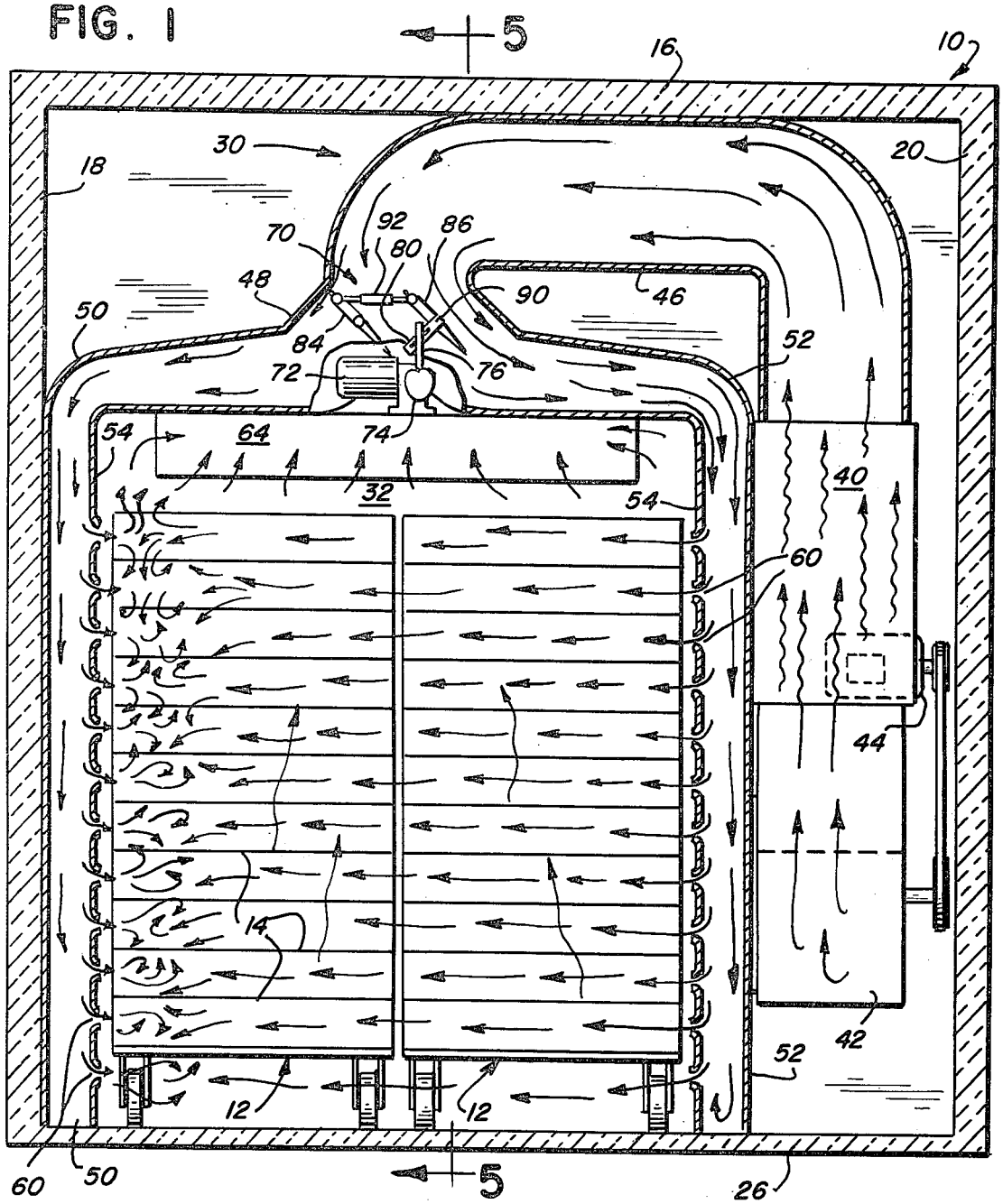
FIG. 1 is a schematic front view of the oven with the front wall and doors removed.

Referring now to the drawings, in FIG. 1 there is shown an oven 10 in which a pair of movable racks 12 have been placed, for processing or cooking various food products, such as bakery goods, on a plurality of shelves 14.

The oven is constructed with an outer top wall 16, opposite side walls 18,20, a front wall 22, a rear wall 24, and a bottom wall or floor 26. Suitable doors 28 are mounted in the front wall.

Arranged within the oven is a duct assembly indicated generally by reference numeral 30, and arranged to define a processing chamber 32 in which the food racks 12 are placed. It will be appreciated from reference to the drawings that the chamber 32 defines a region of the oven which is substantially completely filled with food products on the movable racks. Thus, it will be understood that a significant advantage of the present invention is to fully utilize the cooking space within the oven so that additional quantities of food products can be treated within an oven of given size. The invention is particularly advantageous in commercial baking or cooking installations.

A heating unit 40 is mounted within the oven, and is provided with suitable controls (not shown). It will be understood that the heating unit can be a gas or oil fired heater or an electrical heating unit of any conventional design or construction. Cooperating with heating unit 40 is a fan or blower 42, driven by a suitable motor 44, and shown connected adjacent to the heating unit for circulating warm air through the cooking chamber of the oven and then back to the heating unit, always at a positive pressure.

The duct assembly 30 includes a main delivery conduit 46 extending over the chamber 32 and terminating in a downwardly directed supply conduit 48 leading to a pair of supply passages 50,52 defining two sides of the oven chamber 32. In effect, the supply passages 50,52 are hollow side walls enclosing the sides of the chamber. These passages may conveniently be constructed of sheet metal, for example, forming a pair of supply ducts having vertical inner walls 54. Each wall of the supply passage or duct is formed with a series of horizontally extending narrow openings or jet orifices 60 for conducting heated air into the cooking chamber 32, as will be described hereinafter, at a positive pressure.

The duct assembly 30 is arranged so that warm air from the heating unit 40 is circulated by fan 42 passing upwardly through main delivery conduit 46, through side supply ducts 50,52 and then through the vertically arranged series of slot openings 60. This arrangement permits the delivery of hot air jets into the cooking chamber 32 for intimate mixing with all of the food products being processed.

Within the duct assembly above the chamber is a return duct 64 to withdraw and return the air for recirculation and reheating, as shown best in FIG. 5. The return duct 64 is provided with a plurality of suitable openings 66 in the sides and the bottom portions thereof for conducting return air back to the recirculating blower and the heating unit.

Figure 2:
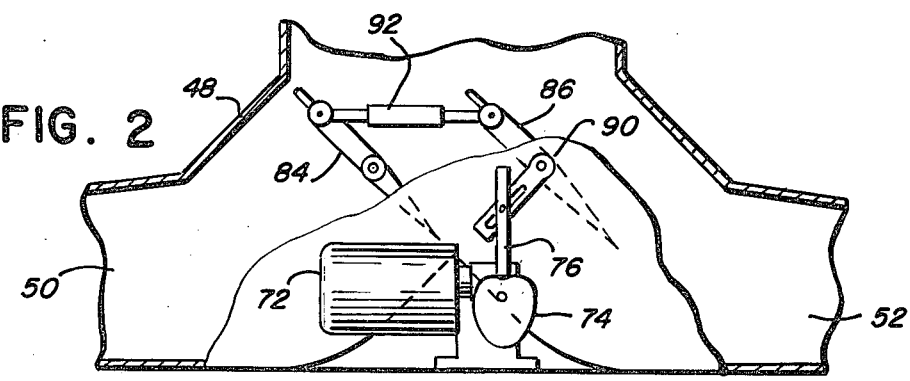
FIG. 2 is an enlarged view of part of the oven shown in FIG. 1, illustrating the variable air directing control means.

A variable air directing control vane assembly 70 is mounted in main supply conduit 48 and is constructed to provide selectively alternating heated air flow to the sides of the chamber 32 in the oven. A control motor 72 is mounted above the return duct and is coupled to a rotatable cam 74 and follower device 76, above which is mounted a linkage device 80. As shown in FIG. 2, the device includes an arm connected to one of a pair of elongated, horizontally arranged air directing vanes 84,86 The air directing vanes are mounted for limited pivotal movement about parallel axes 90 and are interconnected by a suitable crosslink 92 to enable movement under control of the cam and motor drive. It will be understood that other air directing arrangements can be utilized to provide a timed, selective control of the relative air pressures and air flow between the side supply passages 50,53

In the position illustrated in FIGS. 1 and 2, air directing vanes 84,86 are shown in one extreme position, blocking most of the air passage to the left side delivery conduit, while directing substantially full air flow from main supply duct 46 into the right side passageway 52. The cam shape and speed of motor 72 effectively control movement of the linkage 80 to alternate the adjustable vane assembly, shifting the air directing vanes 84,86 gradually from one side to the other, in order to change the direction of hot air flow leading into the oven.

Referring again to FIG. 1, the principal volume of hot air under pressure leading from the heater and blower passes through the main supply conduit 46,48 and downwardly past the air directing vane assembly 70 to the right hand delivery conduit or passageway 52.

The arrows leading to the left hand side of the oven area illustrate the by-pass flow under positive pressure of a smaller volume of hot air. In the position shown schematically in FIG. 3, air flows to both passages, while in FIG. 4, the air directing vanes allow for some by-pass or flow of air to the right side, while directing the main flow of hot air into the oven chamber via the left side passage 50. In either extreme position of the air directing vanes (shown in FIG. 1 or FIG. 4), some hot air will flow under pressure to the opposite side of the oven. This is an important feature of the invention to ensure that the hot air jets provide turbulence in the cooking chamber, as the air pressure varies from side to side.

The duct system and air flow delivery and return system is totally enclosed and operates at a pressure above atmospheric whereby there will always be a positive pressure within the system regardless of the relative changes in air pressure and direction of the main flow of hot air delivered to the cooking chamber 32 of the oven.

Referring to FIGS. 1 and 5, the elongated openings 60 in the sides of both the delivery conduits 50,52 are constructed to produce hot air jets, accelerating the heated air entering the oven chamber, regardless of the position of the vane assembly and the direction of the main flow of air within the system. In the position shown in FIG. 1, the main supply of hot air is delivered to the right hand side of the oven through the array of jet openings 60 in supply conduit 52, resulting in a flow of heated air horizontally from right to left, as shown by the solid line arrows in FIG. 1. However, because of the positive pressure within the system and the supplemental air flow to the left side, a smaller amount of hot air will also be delivered through the openings in the left passageway 50 creating hot air jets flowing into the chamber 32 from the left.

In the embodiment shown in FIG. 1, the main flow of hot air jets will pass substantially across the cooking chamber 32 and will meet the hot air jets entering the chamber from the left passageway 50, producing a generally vertical plane of turbulence, illustrated by the short curved arrows along the left side of the chamber.

By selective control of the motor and the cam assembly, the air directing vanes are rotated away from the position shown in FIG. 1, causing a gradual shift of hot turbulent air within the cooking chamber 32. When the air directing vanes 84,86 are moved from the angular position shown in FIG. 1 to a substantially vertical position shown schematically in FIG. 3, there will be a generally even supply of heated air under pressure to both sides of the oven, and this will cause movement of the vertical plane of turbulent air to about the midpoint of the cooking chamber. As the air directing vane assembly is shifted further to the extreme position shown in FIG. 4, diverting main air flow under pressure to the left side, the vertical plane of turbulent hot air will sweep further toward the right hand side of the cooking chamber. By continuously oscillating the air directing vane assembly 70, and varying the air pressure from side to side, the vertical plane of turbulent heated air within the cooking chamber passes gradually and repeatedly from one side to the other, assuring a constant movement of hot turbulent air throughout the cooking chamber to contact the entire food product contained therein.

The controlled alternating of air directing vane assembly 70 provides a "sweeping" motion of the turbulent heated air delivered into the cooking chamber 32, under positive pressure, and with gradual variations in relative air pressure from side to side.

Other air flow control devices can be used, but must provide for an alternating pattern of air delivery under positive pressure to the outlet openings in the supply passageways 50,52, to provide a turbulent zone mixing the hot air which travels from side to side as air pressure varies, and then upwardly through the food product being processed.

It will also be appreciated that, contrary to what has been known, the turbulent zone of hot air under positive pressure and the "sweeping" of the turbulent hot air from one side to the other, provides a much more uniform distribution of heated air throughout the cooking chamber and through the entire food product. Movement of the products inside the oven is completely avoided.

The system operates at a pressure above atmospheric while the relative air pressures at each side of the oven vary depending upon the position of the air directing vane assembly. At no time is the heated air withdrawn from the chamber through the side jet openings in the supply passageways since the entire system operates at a positive pressure relative to the atmosphere.

A substantial improvement is provided by this invention in that the entire processing chamber is utilized for the processing of food products and there is no additional unused space necessary to accommodate various kinds of product movement devices.

It will also be appreciated that the principles of this invention could be used in processing or drying products other than food, for example, lumber or the like.

I claim:

1. In a variable air flow oven, having an air circulating system and a heating unit, the improvement which comprises a variable air directing control means for varying positive pressures of heated air flow from opposite sides of the oven through jet orifice means causing interaction of heated air jets from opposite sides of the oven meeting at a region of common velocity for causing a turbulence and mixing of the heated air which region of heated turbulent air travels from one side of the oven to the other substantially throughout a heating period.

2. In a variable air flow oven, having an air circulating system and a heating unit, the improvement which comprises a variable control means including a driven cam and adjustable air directing vane assembly for varying heated air flow under positive pressure from opposite sides of the oven through jet orifice means causing interaction of heated air jets from opposite sides of the oven meeting at a region of common velocity for causing a turbulence and mixing of the heated turbulent air which region of heated turbulent air travels from one side of the oven to the other substantially throughout a heating period, said heated turbulent air moving in a pattern which is predetermined by the configuration of said cam.

3. In a variable air flow oven, having a cooking chamber adapted to receive a product, an air circulating system and a heating unit, the improvement which comprises a variable air directing control mechanism for varying heated air flow under positive pressure from opposite sides of the oven through jet orifice means causing interaction of heated air jets from opposite sides of the oven meeting at a region of common velocity for causing a turbulence and mixing of the heated air which region of heated turbulent air travels from one side of the oven to the other substantially throughout a heating period, and means in said circulating system for drawing air from said chamber for reheating and recirculation, said air directing control mechanism including air directing vanes which determine a predetermined flow pattern of said heated turbulent air passing over said product.

4. In a variable air flow oven, having an air circulating system and a heating unit, the improvement which comprises a variable air directing control mechanism including a cam controlled vane assembly for varying heated air flow with variable positive pressures from opposite sides of the oven through jet orifice means causing interaction of heated air jets from opposite sides of the oven meeting at a region of common velocity for causing a turbulence and mixing of the heated air which region of heated turbulent air travels from one side of the oven to the other substantially throughout a heating period, said air directing control mechanism increasing and decreasing the air pressure from side to side at an inverse ratio with said positive pressure on both sides, causing movement of the heated turbulent air from side to side for even distribution of said heated turbulent air, the configuration and speed of said cam determining the lateral motion of said heated turbulent air passing over a product in said oven.

5. A variable air flow oven, comprising a cooking chamber adapted to receive a product, an air circulating system and a heating unit, an adjustable alternating control means including a driven cam and an adjustable air directing vane assembly for varying heated air flow under positive pressure from opposite sides of the oven through jet orifice means causing interaction of heated air jets from opposite sides of the oven meeting at points a region of common velocity for causing a turbulence and mixing of the heated air which region of heated turbulent air travels from one side of the oven to the other substantially throughout a heating period, said control means increasing and decreasing the air pressure from side to side with an inverse ratio, while maintaining said positive pressure on both sides, causing said movement of the heated turbulent air back and forth throughout said chamber, the configuration of said cam establishing a pattern of heated turbulent air flow over said product, and means in said circulating system for drawing air from said chamber for reheating and recirculation.

* * * * *